US012583984B2

(12) United States Patent
Dotson et al.

(10) Patent No.: US 12,583,984 B2
(45) Date of Patent: Mar. 24, 2026

(54) THERMOPLASTIC POLYMER COMPOSITION AND METHOD FOR MAKING FILMS FROM THE SAME

(71) Applicant: Milliken & Company, Spartanburg, SC (US)

(72) Inventors: Darin Dotson, Moore, SC (US); Xiaoyou Xu, Spartanburg, SC (US); Walter Forrister, Inman, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 18/798,976

(22) Filed: Aug. 9, 2024

(65) Prior Publication Data

US 2024/0400774 A1     Dec. 5, 2024

Related U.S. Application Data

(62) Division of application No. 17/386,665, filed on Jul. 28, 2021, now Pat. No. 12,065,550.

(60) Provisional application No. 63/060,303, filed on Aug. 3, 2020.

(51) Int. Cl.

| | |
|---|---|
| *C08L 23/06* | (2006.01) |
| *B29C 48/00* | (2019.01) |
| *B29C 48/10* | (2019.01) |
| *B29C 49/00* | (2006.01) |
| *C08F 110/02* | (2006.01) |
| *C08J 5/18* | (2006.01) |
| *C08K 5/00* | (2006.01) |
| *C08K 5/098* | (2006.01) |
| *B29L 23/00* | (2006.01) |

(52) U.S. Cl.
CPC ............. *C08J 5/18* (2013.01); *B29C 48/0018* (2019.02); *B29C 48/022* (2019.02); *B29C 48/10* (2019.02); *C08F 110/02* (2013.01); *C08K 5/0083* (2013.01); *C08K 5/098* (2013.01); *C08L 23/06* (2013.01); *B29K 2023/06* (2013.01); *B29L 2023/001* (2013.01); *C08J 2323/06* (2013.01); *C08J 2423/06* (2013.01); *C08K 2201/014* (2013.01); *C08L 2203/16* (2013.01); *C08L 2203/30* (2013.01); *C08L 2205/03* (2013.01); *C08L 2205/24* (2013.01)

(58) Field of Classification Search
CPC ....... C08L 23/06; C08K 5/0083; C08K 5/098; B29C 49/04; B29C 48/00
See application file for complete search history.

(56) References Cited

U.S. PATENT DOCUMENTS

| | | |
|---|---|---|
| 6,465,551 B1 | 10/2002 | Zhao |
| 6,559,211 B2 | 5/2003 | Zhao |
| 7,094,820 B2 | 8/2006 | Zhao |
| 8,026,305 B2 | 9/2011 | Mcleod |
| 8,436,085 B2 | 5/2013 | Borke |
| 8,809,433 B2 | 8/2014 | Borke |
| 9,587,093 B2 | 3/2017 | Aubee |
| 9,644,087 B2 | 5/2017 | Aubee |
| 9,850,369 B2 | 12/2017 | Aubee |
| 10,066,093 B2 | 9/2018 | Aubee |
| 11,118,027 B2 * | 9/2021 | Dotson ................. C08K 5/098 |
| 11,746,212 B2 * | 9/2023 | Dotson ................. C08K 5/098 |
| | | 524/400 |
| 2005/0038151 A1 | 2/2005 | Kochanowicz |
| 2005/0038157 A1 * | 2/2005 | Kochanowicz ...... C08K 5/0083 |
| | | 524/543 |
| 2005/0101710 A1 | 5/2005 | Lake |
| 2005/0101713 A1 | 5/2005 | Lake |
| 2020/0095397 A1 | 3/2020 | Xu |
| 2020/0231793 A1 * | 7/2020 | Alvarez ................. C08L 23/14 |
| 2022/0033599 A1 | 2/2022 | Dotson |
| 2022/0033629 A1 * | 2/2022 | Dotson .................... C08K 3/26 |
| 2022/0235196 A1 * | 7/2022 | Forrister .............. B29C 48/022 |

FOREIGN PATENT DOCUMENTS

| | | |
|---|---|---|
| CA | 3032082 A1 | 7/2020 |
| CN | 105764971 | 7/2016 |
| JP | 2002348326 A | 12/2002 |
| TW | 201706367 | 2/2017 |

OTHER PUBLICATIONS

Darin L Dotson: "A novel nucleating agent for polyethylene", Internet Citation, Feb. 27, 2013 (Feb. 27, 2013), pp. 1-15, XP002726372, Retrieved from the Internet: URL:https://web.archive.org/web/20130227224237/http://www.tappi.org/content/events/07place/papers/dotson.pdf [retrieved on Jun. 30, 2014].

(Continued)

*Primary Examiner* — Rip A Lee

(74) *Attorney, Agent, or Firm* — Robert M. Lanning

(57)     ABSTRACT

A thermoplastic polymer composition comprises a polyethylene polymer composition and a salt of bicyclo[2.2.1] heptane-2,3-dicarboxylic acid. The polyethylene polymer composition can have a Melt Relaxation Index of 2 or greater. A method for molding a thermoplastic polymer composition comprises the steps of (a) providing an apparatus comprising a die with an annular orifice, a means for blowing pressurized fluid into a tube exiting the die orifice, and a means for drawing and collecting the tube; (b) providing the thermoplastic polymer composition described above; (c) heating the thermoplastic polymer composition to melt the thermoplastic polymer composition; (d) extruding the molten thermoplastic polymer composition through the die to form a tube; (e) blowing a pressurized fluid into the tube to inflate the tube while simultaneously drawing it; (f) allowing the film to cool; and (g) collecting the film.

16 Claims, No Drawings

(56)            References Cited

OTHER PUBLICATIONS

International Search Report and Written Opinion for App. No. PCT/US2021/043369, dated Nov. 16, 2021, 14 pages.

* cited by examiner

THERMOPLASTIC POLYMER COMPOSITION AND METHOD FOR MAKING FILMS FROM THE SAME

CROSS-REFERENCE TO RELATED PATENT APPLICATIONS

This application is a divisional of and, pursuant to 35 U.S.C. §§ 120 and 121, claims priority to and the benefit of the filing date of U.S. patent application Ser. No. 17/386,665 filed on Jul. 28, 2021, now U.S. Pat. No. 12,065,550 which application claims, pursuant to 35 U.S.C. § 119(e), priority to and the benefit of the filing date of U.S. Patent Application No. 63/060,303 filed on Aug. 3, 2020, the contents of which applications are hereby incorporated by reference.

TECHNICAL FIELD

The invention relates to thermoplastic polymer compositions and methods for making films (e.g., blown films) from the same.

BACKGROUND

Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer. Nucleating agents can also produce an orientation of crystalline lamellae in the polymer that would not result in a polymer that undergoes self-nucleated crystallization. Depending on the orientation of crystalline lamellae produced by the nucleating agent, the physical properties of articles made from the polymer can be improved relative to a polymer that undergoes self-nucleated crystallization.

Further, the effectiveness of a nucleating agent may depend on certain physical properties of the polymer that is being nucleated. In other words, a given nucleating agent may more effectively nucleate a polyethylene polymer having one set of physical properties than another polyethylene polymer having a different set of physical properties. The effectiveness of the nucleating agent often depends on several physical properties of the polymer. The interrelationship between the various physical properties and their effect on the nucleating agent has made it difficult to readily identify a pairing of nucleating agent and polymer that will yield a polymer composition having the desired characteristics.

Thus, a need remains for combinations of polymer and nucleating agent that exhibit favorable nucleation and yield polymer compositions having desirable physical properties, such as lower water vapor and oxygen transmission rates. A need also remains for processes utilizing such beneficial combinations of polymer and nucleating agent, such as blow molding and blown film processes. The polymer compositions and methods described in the application seek to fulfill these needs.

BRIEF SUMMARY

In a first embodiment, the invention provides a thermoplastic polymer composition comprising:

(a) a polyethylene polymer composition having a Melt Relaxation Index of 2 or greater; and (b) a salt of bicyclo[2.2.1]heptane-2,3-dicarboxylic acid.

In a second embodiment, the invention provides a method for producing a film from a thermoplastic polymer composition. The method comprises the steps of:

(a) providing an apparatus comprising:

(i) a die having an annular die orifice adapted to extrude a tube;

(ii) a means for blowing pressurized fluid into the tube exiting the annular die orifice; and (iii) a means for drawing and collecting the tube;

(b) providing a thermoplastic polymer composition comprising (i) a polyethylene polymer composition having a Melt Relaxation Index of 2 or greater; and (ii) a salt of bicyclo[2.2.1]heptane-2,3-dicarboxylic acid;

(c) heating the thermoplastic polymer composition to a temperature sufficient to melt the thermoplastic polymer composition so that it may be extruded through the die;

(d) extruding the molten thermoplastic polymer composition through the annular die orifice to form a tube exiting the annular die orifice in a first direction, the tube having a diameter and a length;

(e) blowing a pressurized fluid into the tube under sufficient pressure to inflate the tube and increase its diameter while simultaneously drawing the tube in the first direction to increase its length, thereby producing a film;

(f) allowing the film to cool to a temperature at which the thermoplastic polymer composition solidifies; and (g) collecting the film.

DETAILED DESCRIPTION

In a first embodiment, the invention provides a thermoplastic polymer composition comprising a polyethylene polymer composition and a salt of bicyclo[2.2.1]heptane-2, 3-dicarboxylic acid.

The polyethylene polymer composition utilized in the composition can comprise any suitable polyethylene polymer or mixture of polyethylene polymers. However, it is believed that the bicyclo[2.2.1]heptane-2,3-dicarboxylic acid salt is more effective at nucleating polyethylene polymer compositions which exhibit greater degrees of melt relaxation. During certain melt processing of a polymer (e.g., blown film manufacturing), the polymer melt is subjected to extensional thinning or strain as it is extruded through a die. The polymer melt may be subjected to further extensional thinning or strain as the extruded polymer melt is further processed, such as being drawn and/or blown. The strain applied to the polymer melt results in a flow direction orientation of extended polymer chains in the polymer melt. As the processed polymer melt cools, these directionally oriented, extended polymer chains can return to a less ordered state before crystallization of the polymer melt. This process is referred to herein as "melt relaxation." Alternatively, the directionally oriented, extended polymer chains can remain oriented in the melt and crystallize to form fibrils. These fibrils provide sites which can initiate self-nucleation of the polymer. If enough of such fibrils form in the polymer as it solidifies from the melt, the resulting strain-induced self-nucleation can become the dominant mode of nucleation in the polymer. While self-nucleation of the polymer may sound beneficial, the polymer structure produced by such self-nucleation is generally less favorable for certain desired physical properties. For example, self-nucleated polyethylene generally exhibits higher water vapor and oxygen transmission rates than polyethylene that has been heterogeneously nucleated with a bicyclo[2.2.1] heptane-2,3-dicarboxylic acid salt. Thus, in order to maximize the degree of nucleation induced by the bicyclo[2.2.1] heptane-2,3-dicarboxylic acid salt, the thermoplastic polymer composition preferably contains a polyethylene polymer that exhibits sufficient melt relaxation to ensure that strain-induced, self-nucleation will not dominate.

The degree of melt relaxation exhibited by a polymer cannot easily be directly quantified. Further, it is believed that melt relaxation can be influenced by a number of factors, such as molecular weight, breadth of the molecular weight distribution, the relative amount of the high molecular weight fraction in the molecular weight distribution, and branching or non-linear chains in the polymer. The number of factors involved and the complex relationship between those factors make it difficult to identify ranges of values for each that will be sufficient to define a polyethylene polymer that exhibits sufficient melt relaxation. In other words, one might try to define a molecular weight distribution for polymers that exhibit sufficient melt relaxation, but the appropriate range will change with the "shape" of the distribution (i.e., the relative amount of the high molecular weight fraction). Thus, while these factors can be considered when attempting to identify a polyethylene polymer that exhibits sufficient melt relaxation, a more direct and accurate gauge of melt relaxation is needed.

The shear storage modulus (G') of a viscoelastic material (e.g., a polymer melt) is related to stored energy (stress), such as that stored in the directionally oriented, extended polymer chains described above. The shear loss modulus (G") of a viscoelastic material is related to energy loss or dissipation, such as that released by relaxation of the directionally oriented, extended polymer chains in the polymer melt. The ratio of the shear loss modulus and the shear storage modulus (G"/G'), which is defined as tan δ, is proportional to the loss versus storage of energy at a given strain rate. In a material with tan δ less than 1, the storage of energy predominates at the measured strain rate. In a material with tan δ greater than 1, the loss (dissipation) of energy predominates at the measured strain rate. Further, a comparison of tan δ (e.g., a ratio of tan δ) measured at different strain rates can be used to quantify the degree to which the predominance of energy loss and energy storage change in the material with changes in the strain rate.

The shear storage modulus and shear loss modulus can be measured by various techniques and at various strains rates. However, if the moduli are to be used in accurately gauging melt relaxation in the polymer, both moduli should be measured at or near strain rates to which the polymer melt will be subjected during melt processing. To that end, the inventors believe that measurement of the shear storage modulus and shear loss modulus by parallel plate rheometer at angular frequencies of approximately 0.1 rad/s and approximately 10 rad/s provide a fair approximation of the strain rates to which the polyethylene polymer composition melt will be subjected during processing. As noted before, the ratio between tan δ at these two strain rates can be used to show changes in energy loss and energy storage as the strain rate changes. After extensive experimentation with various polymers and polymer compositions, it is believed that polyethylene polymers in which energy loss appreciably increases (i.e., tan δ appreciably increases) as the strain rate decreases (i.e., the angular frequency decreases) exhibit sufficient melt relaxation for heterogeneous nucleation with a bicyclo[2.2.1]heptane-2,3-dicarboxylic acid salt. In particular, it is believed that the ratio between tan δ at approximately 0.1 rad/s and tan δ at approximately 10 rad/s is particularly useful at identifying polymers that exhibit desirable levels of melt relaxation. However, the ratio of tan δ values at which sufficient melt relaxation occurs has also been determined to be affected by the molecular weight of the polymer, with polymers having a higher molecular weight requiring a higher ratio to achieve sufficient melt relaxation. Thus, the ratio between tan δ values needs an additional factor to account for the effect of the polymer's molecular weight. The molecular weight of a polymer is generally inversely proportional to the Melt Flow Index of the polymer. Further, the relationship between molecular weight and Melt Flow Index is not linear—it is more generally logarithmic in nature. Accordingly, the ratio between tan δ values can be augmented to account for the molecular weight effect by multiplying the ratio by the sum of 1 and the natural logarithm of the Melt Flow Index of the polymer. The resulting parameter, which is hereafter referred to as the "Melt Relaxation Index," should be 2 or greater. In other words, the polyethylene polymer composition preferably has a Melt Relaxation Index of 2 or greater, more preferably 2.1 or greater.

As noted above, the Melt Relaxation Index (MRI) is defined as the product of (i) the sum of 1 and the natural logarithm of the Melt Flow Index of the polymer and (ii) the ratio between tan δ at approximately 0.1 rad/s and tan δ at approximately 10 rad/s:

$$MRI = (1 + \log(MFI)) \times \frac{\tan \delta_{0.1\,rad/s}}{\tan \delta_{10\,rad/s}}$$

In the definition, the two angular frequencies have been defined as being approximately equal to a given value. Thus, tan δ at approximately 0.1 rad/s can be measured at any angular frequency between 0.095 and 0.105 rad/s, and tan δ at approximately 10 rad/s can be measured at any angular frequency between 9.5 rad/s and 10.5 rad/s. While the exact angular frequencies used in determining MRR can vary within the ranges noted above, the ratio of the two angular frequencies must be 0.01 (i.e., there must be a 100-fold difference between the two angular frequencies). The Melt Flow Index of the polymer, which can be reported in units of decigrams per minute (dg/min) or grams per 10 minutes (g/10 min), is measured in accordance with ASTM Standard D1238 at 190° C. using a 2.16 kg load.

The Melt Relaxation Index can be measured by any suitable technique. Preferably, the shear loss modulus (G"), the shear storage modulus (G'), and tan δ are determined by parallel plate rheometry at a temperature of 190° C. using a rotational rheometer equipped with 25 mm parallel plates set at a 1.1 mm gap. The polymer sample used for measurement is provided in the form of a compression molded disc. During the measurement, the angular distance or strain preferably is kept low to remain in the non-hysteresis region, with a nominal strain of approximately one percent being preferred. Since these parameters are determined from the polymer melt, the presence of the nucleating agent will not have any appreciable effects on the shear loss modulus (G"), the shear storage modulus (G'), tan δ, or Melt Flow Index measured from the polyethylene polymer composition.

Therefore, these parameters (and the Melt Relaxation Index) can be measured from the polyethylene polymer composition before it is combined with the bicyclo[2.2.1]heptane-2,3-dicarboxylic acid salt, or the parameters can be measured from a thermoplastic polymer composition comprising the polyethylene polymer composition and the bicyclo[2.2.1]heptane-2,3-dicarboxylic acid salt.

As noted above, the polyethylene polymer composition can comprise any suitable polyethylene polymer or mixture of polyethylene polymers exhibiting the desired Melt Relaxation Index. Thus, the polyethylene polymer composition can comprise a single polyethylene polymer exhibiting the desired Melt Relaxation Index. Alternatively, the polyethylene polymer composition can comprise a mixture of two or more polyethylene polymers in which the mixture exhibits the desired Melt Relaxation Index. In such a mixture, each polyethylene polymer can exhibit a Melt Relaxation Index falling within the desired range, but this is not necessary. For example, a polyethylene polymer exhibiting a relatively low Melt Relaxation Index (e.g., less than 2) can be mixed with an appropriate amount of another polyethylene polymer having a higher Melt Relaxation Index (e.g., 2.1 or more) to yield a polyethylene polymer composition exhibiting the desired Melt Relaxation Index.

Polyethylene polymers suitable for use in the polyethylene polymer composition include polyethylene homopolymers and polyethylene copolymers. Suitable polyethylene copolymers include copolymers of ethylene with one or more α-olefins. Suitable α-olefins include, but are not limited to, 1-butene, 1-hexene, 1-octene, 1-decene, and 4-methyl-1-pentene. The comonomer can be present in the copolymer in any suitable amount, such as an amount of about 8% by weight (e.g., less than about 5 mol %) or more preferably about 5% by weight or less (e.g., about 3 mol. % or less). As will be understood by those of ordinary skill in the art, the amount of comonomer suitable for the polyethylene copolymer is largely driven by the end use for the copolymer and the required or desired polymer properties dictated by that end use.

The polyethylene polymers suitable for use in the thermoplastic polymer composition can be produced by any suitable process. For example, the polymers can be produced by a free radical process using very high pressures as described, for example, in U.S. Pat. No. 2,816,883 (Larchar et al.), but the polymers typically are produced in a "low pressure" catalytic process. In this context, the term "low pressure" is used to denote processes carried out at pressures less than 6.9 MPa (e.g., 1,000 psig), such as 1.4-6.9 MPa (200-1,000 psig). Examples of suitable low pressure catalytic processes include, but are not limited to, solution polymerization processes (i.e., processes in which the polymerization is performed using a solvent for the polymer), slurry polymerization processes (i.e., processes in which the polymerization is performed using a hydrocarbon liquid in which the polymer does not dissolve or swell), gas-phase polymerization processes (e.g., processes in which the polymerization is performed without the use of a liquid medium or diluent), or a staged reactor polymerization process. The suitable gas-phase polymerization processes also include the so-called "condensed mode" or "super-condensed mode" processes in which a liquid hydrocarbon is introduced into the fluidized-bed to increase the absorption of the heat produced during the polymerization process. In these condensed mode and super-condensed mode processes, the liquid hydrocarbon typically is condensed in the recycle stream and reused in the reactor. The staged reactor processes can utilize a combination of slurry process reactors (tanks or loops) that are connected in series, parallel, or a combination of series or parallel so that the catalyst (e.g., chromium catalyst) is exposed to more than one set of reaction conditions. Staged reactor processes can also be carried out by combining two loops in series, combining one or more tanks and loops in series, using multiple gas-phase reactors in series, or a loop-gas phase arrangement. Because of their ability to expose the catalyst to different sets of reactor conditions, staged reactor processes are often used to produce multimodal polymers, such as those discussed below. Suitable processes also include those in which a pre-polymerization step is performed. In this pre-polymerization step, the catalyst typically is exposed to the cocatalyst and ethylene under mild conditions in a smaller, separate reactor, and the polymerization reaction is allowed to proceed until the catalyst comprises a relatively small amount (e.g., about 5% to about 30% of the total weight) of the resulting composition. This pre-polymerized catalyst is then introduced to the large-scale reactor in which the polymerization is to be performed.

The polyethylene polymers suitable for use in the thermoplastic polymer composition can be produced using any suitable catalyst or combination of catalysts. Suitable catalysts include transition metal catalysts, such as supported reduced molybdenum oxide, cobalt molybdate on alumina, chromium oxide, and transition metal halides. Chromium oxide catalysts typically are produced by impregnating a chromium compound onto a porous, high surface area oxide carrier, such as silica, and then calcining it in dry air at 500-900° C. This converts the chromium into a hexavalent surface chromate ester or dichromate ester. The chromium oxide catalysts can be used in conjunction with metal alkyl cocatalysts, such as alkyl boron, alkyl aluminum, alkyl zinc, and alkyl lithium. Supports for the chromium oxide include silica, silica-titania, silica-alumina, alumina, and aluminophosphates. Further examples of chromium oxide catalysts include those catalysts produced by depositing a lower valent organochromium compound, such as bis(arene) $Cr^0$, allyl $Cr^{2+}$ and $Cr^{3+}$, beta stabilized alkyls of $Cr^{2+}$ and $Cr^{4+}$, and bis(cyclopentadienyl) $Cr^{2+}$, onto a chromium oxide catalyst, such as those described above. Suitable transition metal catalysts also include supported chromium catalysts such as those based on chromocene or a silylchromate (e.g., bi(trisphenylsilyl)chromate). These chromium catalysts can be supported on any suitable high surface area support such as those described above for the chromium oxide catalysts, with silica typically being used. The supported chromium catalysts can also be used in conjunction with cocatalysts, such as the metal alkyl cocatalysts listed above for the chromium oxide catalysts. Suitable transition metal halide catalysts include titanium (III) halides (e.g., titanium (III) chloride), titanium (IV) halides (e.g., titanium (IV) chloride), vanadium halides, zirconium halides, and combinations thereof. These transition metal halides are often supported on a high surface area solid, such as magnesium chloride. The transition metal halide catalysts are typically used in conjunction with an aluminum alkyl cocatalyst, such as trimethylaluminum (i.e., $Al(CH_3)_3$) or triethylaluminum (i.e., $Al(C_2H_5)_3$). These transition metal halides may also be used in staged reactor processes. Suitable catalysts also include metallocene catalysts, such as cyclopentadienyl titanium halides (e.g., cyclopentadienyl titanium chlorides), cyclopentadienyl zirconium halides (e.g., cyclopentadienyl zirconium chlorides), cyclopentadienyl hafnium halides (e.g., cyclopentadienyl hafnium chlorides), and combinations thereof. Metallocene catalysts based on transition metals complexed with indenyl or fluorenyl ligands are also known and can be used to produce high density polyethylene polymers suitable for use in the invention. The catalysts typically contain multiple ligands, and the ligands can be substituted with various groups (e.g., n-butyl group) or linked with bridging groups, such as $-CH_2CH_2-$ or $>SiPh_2$. The metallocene catalysts typically are used in conjunction with a cocatalyst, such as methyl aluminoxane (i.e., $(Al(CH_3)_xO_y)_n$. Other cocatalysts include those described in U.S. Pat. No. 5,919,983 (Rosen et al.), U.S. Pat. No. 6,107,230 (McDaniel et al.), U.S. Pat. No. 6,632,894 (McDaniel et al.), and U.S. Pat. No. 6,300,271 (McDaniel et al). Other "single site" catalysts suitable for use in producing polyethylene polymers include diimine complexes, such as those described in U.S. Pat. No. 5,891,963 (Brookhart et al.).

The polyethylene polymer composition (and the polyethylene polymer(s) present in such composition) can have any suitable density. Suitable densities range from about 880 kg/m³ to about 970 kg/m³. Preferably, the polyethylene polymer composition has a density of about 940 kg/m³ or more (e.g., about 940 kg/m³ to about 970 kg/m³). More preferably, the polyethylene polymer composition has a density from about 945 kg/m³ to about 967 kg/m³. In another preferred embodiment, the polyethylene polymer composition has a density from about 955 kg/m³ to about 965 kg/m³.

The polyethylene polymer composition (and the polyethylene polymer(s) present in such composition) can have any suitable Melt Flow Index (MFI). Preferably, the polyethylene polymer composition has an MFI of about 2 dg/min or less. In another preferred embodiment, the polyethylene polymer composition has an MFI of about 1.8 dg/min or less. In yet another preferred embodiment, the polyethylene polymer composition has an MFI of about 1.7 dg/min or less. Preferably, the polyethylene polymer composition has an MFI of about 0.1 dg/min or more. In another preferred embodiment, the polyethylene polymer composition has an MFI of about 0.2 dg/min or more. In yet another preferred embodiment, the polyethylene polymer composition has an MFI of about 0.3 dg/min or more. Thus, in a series of preferred embodiments, the polyethylene polymer composition has an MFI of about 0.1 dg/min to about 2 dg/min (e.g., about 0.1 dg/min to about 1.8 dg/min or about 0.1 dg/min to about 1.7 dg/min), about 0.2 dg/min to about 2 dg/min (e.g., about 0.2 dg/min to about 1.8 dg/min or about 0.2 dg/min to about 1.7 dg/min), or about 0.3 dg/min to about 2 dg/min (e.g., about 0.3 dg/min to about 1.8 dg/min or about 0.3 dg/min to about 1.7 dg/min). The Melt Flow Index of the polyethylene polymer composition preferably is measured in accordance with ASTM Standard D1238 at 190° C. using a 2.16 kg load.

The thermoplastic polymer composition comprises a salt of bicyclo[2.2.1]heptane-2,3-dicarboxylic acid. The two carboxylate moieties of the bicyclo[2.2.1]heptane-2,3-dicarboxylate anion preferably are located in the cis position relative to one another. Further, the two carboxylate moieties of the bicyclo[2.2.1]heptane-2,3-dicarboxylate anion preferably are in the endo position relative to the longest bridge of the anion. Thus, in a preferred embodiment, the thermoplastic polymer composition comprises a salt of cis-endo-bicyclo[2.2.1]heptane-2,3-dicarboxylic acid (i.e., (1R,2R, 3S,4S)-bicyclo[2.2.1]heptane-2,3-dicarboxylic acid). The salt of bicyclo[2.2.1]heptane-2,3-dicarboxylic acid can comprise any suitable counterion for the bicyclo[2.2.1]heptane-2,3-dicarboxylate anion. Preferably, the counterion is selected from the group consisting of alkali metal cations and alkaline earth metal cations. In another preferred embodiment, the counterion is selected from the group consisting of alkaline earth metal cations. Most preferably, the counterion is a calcium cation (i.e., a $Ca^{2+}$ cation). Thus, in a particularly preferred embodiment, the salt is calcium bicyclo[2.2.1]heptane-2,3-dicarboxylate, particularly calcium cis-endo-bicyclo[2.2.1]heptane-2,3-dicarboxylate (i.e., calcium (1R,2R,3S,4S)-bicyclo[2.2.1]heptane-2,3-dicarboxylate).

The salt of a bicyclo[2.2.1]heptane-2,3-dicarboxylic acid can be either a hydrate (i.e., a crystalline solid with water of crystallization) or a dehydrate (i.e., a crystalline solid without water of crystallization) Those skilled in the art will appreciate that the salt of a bicyclo[2.2.1]heptane-2,3-dicarboxylic can also be a physical mixture of a hydrate and a dehydrate. In a preferred embodiment, the salt of a bicyclo[2.2.1]heptane-2,3-dicarboxylic acid is a dehydrate. In another preferred embodiment, the salt of a bicyclo[2.2.1]heptane-2,3-dicarboxylic acid is a hydrate, more preferably a monohydrate. Those skilled in the art will recognize that melt processing of the polymer composition will remove any water of crystallization in the bicyclo[2.2.1]heptane-2,3-dicarboxylic acid salt. Thus, in one preferred embodiment described above, the salt of a bicyclo[2.2.1]heptane-2,3-dicarboxylic acid is a dehydrate prior to melt processing of the thermoplastic polymer composition. Accordingly, the corresponding thermoplastic polymer composition is prepared by adding the desired amount of the dehydrate of a salt of a bicyclo[2.2.1]heptane-2,3-dicarboxylic acid to the polyethylene polymer composition described above. In the other preferred embodiment, the salt of a bicyclo[2.2.1]heptane-2,3-dicarboxylic acid is a hydrate (preferably, a monohydrate) prior to melt processing of the thermoplastic polymer composition. Accordingly, the corresponding thermoplastic polymer composition is prepared by adding the desired amount of the hydrate of a salt of a bicyclo[2.2.1]heptane-2,3-dicarboxylic acid to the polyethylene polymer composition described above. The addition of the bicyclo[2.2.1]heptane-2,3-dicarboxylic acid salt can be made by dry blending of the salt and the polyethylene polymer composition prior to melt compounding or the salt can be added to the polyethylene polymer composition while it is being melt processed, such as through a side feeder attached to an extruder.

The thermoplastic polymer composition can contain any suitable amount of the salt of bicyclo[2.2.1]heptane-2,3-dicarboxylic acid. In a preferred embodiment, the thermoplastic polymer composition comprises about 50 ppm or more of the salt of bicyclo[2.2.1]heptane-2,3-dicarboxylic acid. In another preferred embodiment, the thermoplastic polymer composition comprises about 100 ppm or more of the salt of bicyclo[2.2.1]heptane-2,3-dicarboxylic acid. In yet another preferred embodiment, the thermoplastic polymer composition comprises about 200 ppm or more of the salt of bicyclo[2.2.1]heptane-2,3-dicarboxylic acid. In a preferred embodiment, the thermoplastic polymer composition comprises about 5,000 ppm or less of the salt of bicyclo[2.2.1]heptane-2,3-dicarboxylic acid. In another preferred embodiment, the thermoplastic polymer composition comprises about 3,000 ppm or less of the salt of bicyclo[2.2.1]heptane-2,3-dicarboxylic acid. In yet another preferred embodiment, the thermoplastic polymer composition comprises about 2,500 ppm or less of the salt of bicyclo[2.2.1]heptane-2,3-dicarboxylic acid. Thus, in a series of preferred embodiments, the thermoplastic polymer composition comprises about 50 ppm to about 5,000 ppm (e.g., about 50 ppm to about 3,000 ppm, about 50 ppm to about 2,500 ppm, or about 50 to about 2,000 ppm), about 100 ppm to about 5,000 ppm (e.g., about 100 ppm to about 3,000 ppm, about 100 ppm to about 2,500 ppm, or about 100 to about 2,000 ppm), or about 200 to about 5,000 ppm (e.g., about 200 ppm to about 3,000 ppm, about 200 ppm to about 2,500 ppm, or about 200 to about 2,000 ppm) of the salt of bicyclo[2.2.1]heptane-2,3-dicarboxylic acid.

In a preferred embodiment, the thermoplastic polymer composition comprises an acid scavenger in addition to the polyethylene polymer composition and the salt of bicyclo[2.2.1]heptane-2,3-dicarboxylic acid. Suitable acid scavengers include, but are not limited to, salts of fatty acids, hydrotalcite compound, and mixtures thereof.

Thus, in one preferred embodiment, the thermoplastic polymer composition comprises a salt of a fatty acid in addition to the polyethylene polymer composition and the salt of bicyclo[2.2.1]heptane-2,3-dicarboxylic acid. In a preferred embodiment, the salt of a fatty acid is a salt of a $C_{12}$-$C_{22}$ fatty acid, more preferably a salt of a $C_{14}$-$C_{20}$ fatty acid or a $C_{16}$-$C_{18}$ fatty acid. In another preferred embodiment, the fatty acid is a saturated fatty acid (e.g., a saturated $C_{12}$-$C_{22}$ fatty acid, a saturated $C_{14}$-$C_{20}$ fatty acid, or a saturated $C_{16}$-$C_{18}$ fatty acid). In a particularly preferred embodiment, the salt of a fatty acid is a salt of stearic acid. The salt of a fatty acid can comprise any suitable counterion for the fatty acid anion. Preferably, the counterion is selected from the group consisting of alkali metal cations (e.g., a sodium cation or a potassium cation), alkaline earth metal cations (e.g., a magnesium cation or a calcium cation), and Group 12 cations (e.g., a zinc cation). In a preferred embodiment, the counterion of the salt of a fatty acid is a zinc cation. Thus, in a particularly preferred embodiment, the salt of a fatty acid is zinc stearate (i.e., the polymer composition further comprises zinc stearate).

When present in the thermoplastic polymer composition, the salt of a fatty acid can be present in any suitable amount. In a preferred embodiment, the thermoplastic polymer composition comprises about 50 ppm or more of the salt of a fatty acid. In another preferred embodiment, the thermoplastic polymer composition comprises about 100 ppm or more of the salt of a fatty acid. In yet another preferred embodiment, the thermoplastic polymer composition comprises about 200 ppm or more of the salt of a fatty acid. In a preferred embodiment, the thermoplastic polymer composition comprises about 5,000 ppm or less of the salt of a fatty acid. In another preferred embodiment, the thermoplastic polymer composition comprises about 3,000 ppm or less of the salt of a fatty acid. In yet another preferred embodiment, the thermoplastic polymer composition comprises about 2,500 ppm or less of the salt of a fatty acid. Thus, in a series of preferred embodiments, the thermoplastic polymer composition comprises about 50 ppm to about 5,000 ppm (e.g., about 50 ppm to about 3,000 ppm, about 50 ppm to about 2,500 ppm, or about 50 to about 2,000 ppm), about 100 ppm to about 5,000 ppm (e.g., about 100 ppm to about 3,000 ppm, about 100 ppm to about 2,500 ppm, or about 100 to about 2,000 ppm), or about 200 to about 5,000 ppm (e.g., about 200 ppm to about 3,000 ppm, about 200 ppm to about 2,500 ppm, or about 200 to about 2,000 ppm) of the salt of a fatty acid.

When present in the thermoplastic polymer composition, the salt of a fatty acid can be present in any suitable relative amount with respect to the amount of the salt of a bicyclo[2.2.1]heptane-2,3-dicarboxylic acid. In a preferred embodiment, the two are present in the thermoplastic polymer composition in a mass ratio of about 5:1 to about 1:5 based on the mass of the salt of a bicyclo[2.2.1]heptane-2,3-dicarboxylic acid to the mass of the salt of a fatty acid. In another preferred embodiment, the two are present in the thermoplastic polymer composition in a mass ratio of about 3:1 to about 1:3 based on the mass of the salt of a bicyclo[2.2.1]heptane-2,3-dicarboxylic acid to the mass of the salt of a fatty acid. In yet another preferred embodiment, the two are present in the thermoplastic polymer composition in a mass ratio of about 2:1 to about 1:2 based on the mass of the salt of a bicyclo[2.2.1]heptane-2,3-dicarboxylic acid to the mass of the salt of a fatty acid. More preferably, the two are present in the thermoplastic polymer composition in a mass ratio of about 2:1 to about 1:1 based on the mass of the salt of a bicyclo[2.2.1]heptane-2,3-dicarboxylic acid to the mass of the salt of a fatty acid. Most preferably, the two are present in the thermoplastic polymer composition in a mass ratio of about 2:1 based on the mass of the salt of a bicyclo[2.2.1]heptane-2,3-dicarboxylic acid to the mass of the salt of a fatty acid.

In another preferred embodiment, the thermoplastic polymer composition comprises a hydrotalcite compound in addition to the polyethylene polymer composition and the salt of bicyclo[2.2.1]heptane-2,3-dicarboxylic acid. Suitable hydrotalcite compounds can be either naturally occurring or synthetically produced, though synthetically produced materials are generally preferred. Suitable synthetic hydrotalcite compounds include, but are not limited to, the line of materials sold by Kyowa Chemical Industry Co., Ltd. under the "DHT" name, such as the DHT-4A® hydrotalcite-like material. When present in the thermoplastic polymer composition, the hydrotalcite compound can be present in any suitable amount, including any of the amounts and/or ratios described above for the salt of a fatty acid. Further, the thermoplastic polymer composition can, in certain embodiments, comprise both a salt of a fatty acid and a hydrotalcite compound.

The thermoplastic polymer composition described herein can be used to produce any suitable article or product. Suitable products include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like. The thermoplastic polymer composition can be formed into the desired article by any suitable technique, such as injection molding, injection rotational molding, blow molding (e.g., injection blow molding or injection stretch blow molding), extrusion (e.g., sheet extrusion, film extrusion, cast film extrusion, or foam extrusion), extrusion blow molding, thermoforming, rotomolding, film blowing (blown film), film casting (cast film), and the like. The thermoplastic polymer composition disclosed herein is believed to be particularly well-suited for use in extrusion blow molding and film blowing processes, with film blowing processes being particularly preferred.

The disclosed thermoplastic polymer composition is believed to be well-suited for use in extrusion blow molding and film blowing processes because of its exceptionally improved (i.e., lower) water vapor and oxygen transmission rates as compared to the unnucleated polymer as well as nucleated polymers that do not exhibit the described physical properties (e.g., density, Melt Relaxation Index, Melt Flow Index, etc.). For example, a blown film made from the disclosed thermoplastic polymer composition has been observed to exhibit a markedly lower water vapor transmission rate than a similar blown film made from a nucleated polymer that does not exhibit the desired Melt Relaxation Index. As described noted above, this result is believed to be attributable to the selection of a polyethylene polymer composition that exhibits sufficient melt relaxation to maximize the nucleating effects of the bicyclo[2.2.1]heptane-2,3-dicarboxylic acid salt.

Thus, in a second embodiment, the invention provides a method for producing a film from a thermoplastic polymer composition. The method comprises the steps of:
(a) providing an apparatus comprising:
(i) a die having an annular die orifice adapted to extrude a tube;
(ii) a means for blowing pressurized fluid into the tube exiting the annular die orifice; and
(iii) a means for drawing and collecting the tube;
(b) providing a thermoplastic polymer composition comprising (i) a polyethylene polymer composition having a Melt Relaxation Index of 2 or greater; and (ii) a salt of bicyclo[2.2.1]heptane-2,3-dicarboxylic acid;
(c) heating the thermoplastic polymer composition to a temperature sufficient to melt the thermoplastic polymer composition so that it may be extruded through the die;
(d) extruding the molten thermoplastic polymer composition through the annular die orifice to form a tube exiting the annular die orifice in a first direction, the tube having a diameter and a length;
(e) blowing a pressurized fluid into the tube under sufficient pressure to inflate the tube and increase its diameter while simultaneously drawing the tube in the first direction to increase its length, thereby producing a film;
(f) allowing the film to cool to a temperature at which the thermoplastic polymer composition solidifies; and
(g) collecting the film.

The thermoplastic polymer composition utilized in the method of this second embodiment can be any of the thermoplastic polymer compositions described above. The apparatus used in practicing the method of the invention can be any suitable blown film apparatus. For example, the film blowing machine can be equipped with a single extruder and annular die that produces a monolayer film. Alternatively, the film blowing machine can be equipped with multiple extruders and an appropriate distribution die adapted to combine multiple but separate layers in the melt. The films produced by such a film blowing machine would be multilayer films. When a multilayer film is produced, the thermoplastic polymer composition of the invention can be used to produce any one or more layers of the multilayer film. In other words, the method described above encompasses methods of producing multilayer films in which all layers of the film are produced using the recited thermoplastic polymer composition as well as multilayer films in which the recited thermoplastic polymer composition is used to produce at least one layer of the multilayer film and one or more additional polymer compositions are used to produce the remaining layers of the multilayer film.

In the method described above, the thermoplastic polymer composition can be heated to any suitable temperature that melts the thermoplastic polymer composition and allows it to be extruded through the die. The temperature to which the thermoplastic polymer composition is heated does not have a significant effect on the nucleation performance of the bicyclo[2.2.1]heptane-2,3-dicarboxylate salt, but higher temperatures may promote greater and faster melt relaxation which could, in turn, improve nucleation performance to some degree. However, the temperature to which the thermoplastic polymer composition is heated should not be excessively high, which may lower the viscosity of the molten polymer composition to a point where the tube ruptures when it is inflated by the pressurized fluid. Preferably, the thermoplastic polymer composition is heated to a temperature of about 150° C. to about 220° C. The thermoplastic polymer composition can initially be heated to a temperature of about 150° C. to about 170° C. in the feed throat of the extruder followed by heating to a temperature of about 180° C. to about 220° C. in the final zones of the extruder. Once heated to the desired temperature, the molten thermoplastic polymer composition preferably is maintained at the desired temperature until it is extruded through the annular die orifice. Depending on polymer characteristics, those of ordinary skill in the art of blown film production will recognize the need for temperature adjustments to maintain an appropriate compromise between mass output, system back pressures, and bubble (tube) stability.

The tube of polymer exiting the annular die orifice can be inflated to the desired diameter using any suitable pressure. The pressure required to inflate the tube depends upon several factors, such as the temperature of the molten thermoplastic polymer composition exiting the annular die orifice, the extent to which the diameter of the tube is to be increased, and the desired thickness of the resulting film. Therefore, in practice, the pressure typically is adjusted by the machine operator until a film having the desired properties is obtained.

The film produced by the method described above can be collected in any suitable manner. For example, the inflated tube is generally collapsed into a flattened form by two or more nip rollers. The collapsed tube, or layflat, can be collected in this flattened form or the edges of the layflat can be slit to yield two separate films, which separate films can then be collected.

The following examples further illustrate the subject matter described above but, of course, should not be construed as in any way limiting the scope thereof.

Example 1

The following example demonstrates the production of and properties of several thermoplastic polymer compositions according to the invention.

Table 1 sets forth the density, Melt Flow Index (MFI), tan δ, and Melt Relaxation Index of several commercially available polyethylene polymers. The tan δ and Melt Relaxation Index of Sclair® 2908 is not reported because the viscosity of the polymer is so high that these two parameters cannot be measured at 190° C. The tan δ and Melt Relaxation Index of ExxonMobil LL 1001X31 was not measured because the polymer was only used at a low loading in the blends to improve higher speed extrusion. Seven polyethylene blends (Blends 1-7) were prepared by compounding these polymers in the amounts indicated in Table 1. Table 1 also lists the density, Melt Flow Index (MFI), tan δ, and Melt Relaxation Index of Blends 1-7. To minimize melt fracture during processing, some of the blends also incorporated small amounts of a commercially available polymer processing aid masterbatch containing 3% of a fluorinated polymer processing aid in a linear low-density polyethylene carrier polymer. These polyethylene polymers and polyethylene polymer blends were used in making several polymer compositions, as described below.

TABLE 1

Density, Melt Flow Index (MFI), tan δ, and Melt Relaxation Index
of several polyethylene polymers and polyethylene polymer blends.

| Polymer | Density (kg/m$^3$) | MFI (dg/ min) | tan δ, 0.1 rad/s | tan δ, 10 rad/s | Melt Relaxation Index (MRI) |
|---|---|---|---|---|---|
| Nova Sclair ® 19H | 960 | 0.38 | 2.510 | 0.992 | 1.47 |
| Nova Sclair ® 19A | 962 | 0.72 | 2.225 | 1.041 | 1.83 |
| Dow Unival ® DMDH-6400 | 961 | 0.80 | 1.743 | 1.171 | 1.34 |
| Nova Sclair ® 19C | 958 | 0.95 | 4.978 | 1.807 | 2.69 |
| Nova Sclair ® 19G | 960 | 1.2 | 5.344 | 1.574 | 3.66 |
| Total 9260 | 960 | 2.0 | 5.068 | 1.599 | 4.12 |
| Nova Sclair ® 2908 | 961 | 7.0 | — | — | — |
| ExxonMobil LL 1001X31 | 918 | 1.0 | — | — | — |
| Blend 1: 64% 19H; 32% 2908; 4% 1001X31 | 959 | 1.0 | 2.859 | 1.246 | 2.29 |
| Blend 2: 48% 19H; 48% 2908; 4% 1001X31 | 959 | 1.6 | 3.001 | 1.410 | 2.56 |
| Blend 3: 64.5% DMDH-6400; 31.5% 2908; 4% 1001X31 | 959 | 1.6 | 2.220 | 1.384 | 1.93 |
| Blend 4: 61.5% 19A; 34.5% 2908; 4% 1001X31 | 960 | 1.6 | 2.490 | 1.304 | 2.30 |
| Blend 5: 86% 19C; 10% 19G; 4% 1001X31 | 957 | 0.97 | 3.838 | 1.670 | 2.27 |
| Blend 6: 70% 19C; 26% 2908; 4% 1001X31 | 957 | 1.6 | 4.330 | 1.839 | 2.84 |
| Blend 7: 86% 9260; 10% 19G; 4% 1001X31 | 958 | 1.85 | 5.186 | 1.590 | 4.13 |

In order to facilitate mixing the bicyclo[2.2.1]heptane-2,3-dicarboxylate salt with the polymer to produce a thermoplastic polymer composition, five dilute pellet masterbatch compositions were prepared using the formulation set forth in Table 2 below. For each masterbatch composition, the amount of carrier polymer is the balance of the masterbatch composition weight. The masterbatch compositions were made by grinding the carrier polymer in an attrition mill at room temperature, adding the listed ingredients and mixing in a 30-liter Henschel high intensity mixer for two minutes at 1200 rpm. The resulting mixture was then twin screw compounded and extruded into pellets. The "Nucleator" in Table 2 is in all cases the dehydrate of calcium cis-endo-bicyclo[2.2.1]heptane-2,3-dicarboxylate. Each masterbatch composition contained zinc stearate as the acid scavenger.

TABLE 2

Formulations for masterbatch compositions.

| Masterbatch Composition | Carrier Polymer | Nucleator (wt. %) | Acid Scavenger (wt. %) |
|---|---|---|---|
| MB-1 | Sclair 19H | 0.60 | 0.30 |
| MB-2 | Sclair 19A | 0.60 | 0.30 |
| MB-3 | DMDH-6400 | 0.60 | 0.30 |
| MB-4 | Sclair 2908 | 0.60 | 0.30 |
| MB-5 | Sclair 19G | 0.90 | 0.45 |

Blown films were made using the polyethylene polymers, polymer blends, and/or masterbatch compositions described above. Blown films were made on a small pilot scale coextrusion blown film line equipped with a 5-layer pancake die, 100-mm die lip set, 1.8-mm die gap, 1.25-inch single screw extruders with mixing sections, and dual lip air ring. The same dry blend was fed to all extruders to make essentially monolayer films and run at a feed rate of approximately 20-26 kg/hr depending on the specific polymer or polymer blend used and the resulting backpressure. The resulting film thickness varied from 1.5-1.9 mil. The measured film thickness was used to normalize certain measurements, such as the water vapor transmission rate, as described below. In Table 3, the samples whose designation ends with an "A" were produced from a polymer or polymer blend that did not including any nucleating agent. The samples whose designation ends with a "B" were produced from a polymer composition that contained the calcium cis-endo-bicyclo[2.2.1]heptane-2,3-dicarboxylate as nucleating agent. The samples whose designation ends with a "B" were produced by displacing a portion of the polymer or polymer blend with the stated amount of the masterbatch composition. The final concentration of the nucleating agent in the polymer composition is reported in Table 3.

The water vapor transmission rate (WVTR) for each blown film was measured in accordance with ASTM F 1249 (90% RH, 37.8° C.). The resulting measured WVTR was then normalized to the measured film thickness to permit a more direct sample-to-sample comparison. The normalized water vapor transmission rate is reported as "nWVTR" in Table 3 below.

TABLE 3

Formulation, Melt Relaxation Index (MRI), Nucleator
concentration, and nWVTR for blown films.

| ID | Main Resin/Blend | MRI | Nucleator (ppm) | nWVTR value | nWVTR % drop |
|---|---|---|---|---|---|
| 1A | Sclair 19H + 3% PPA MB | 1.47 | 0 | 4.91 | |
| 1B | Displace 19H with 15% MB-1 | | 900 | 4.76 | 3.0 |
| 2A | Sclair 19A + 4% 1001X31 | 1.83 | 0 | 3.52 | |
| 2B | Displace 19A with 15% MB-2 | | 900 | 3.33 | 5.4 |
| 3A | DMDH-6400 + 3% PPA MB | 1.34 | 0 | 4.97 | |
| 3B | Displace 6400 with 15% MB-3 | | 900 | 4.84 | 2.6 |
| 4A | Sclair 19G + 4% 1001X31 | 3.66 | 0 | 3.22 | |
| 4B | Displace 19G with 10% MB-5 | | 900 | 2.62 | 18.6 |
| 5A | Blend 1 | 2.29 | 0 | 3.73 | |
| 5B | Displace 2908 with 15% MB-4 | | 900 | 3.27 | 12.3 |
| 6A | Blend 2 | 2.56 | 0 | 3.14 | |
| 6B | Displace 2908 with 15% MB-4 | | 900 | 2.46 | 21.7 |
| 7A | Blend 3 | 1.93 | 0 | 4.24 | |
| 7B | Displace 2908 with 15% MB-4 | | 900 | 4.15 | 2.1 |
| 8A | Blend 4 | 2.30 | 0 | 3.19 | |
| 8B | Displace 2908 with 15% MB-4 | | 900 | 2.70 | 15.4 |
| 9A | Blend 5 | 2.27 | 0 | 3.54 | |
| 9B | Displace 19G with 10% MB-5 | | 900 | 2.36 | 33.3 |
| 10A | Blend 6 | 2.84 | 0 | 3.82 | |
| 10B | Displace 2908 with 15% MB-4 | | 900 | 1.86 | 51.3 |
| 11A | Blend 7 | 4.13 | 0 | 3.27 | |
| 11B | Displace 19G with 10% MB-5 | | 900 | 2.61 | 20.2 |

As can be seen from the data in Table 3, the blown films made from a thermoplastic polymer composition containing a bicyclo[2.2.1]heptane-2,3-dicarboxylate salt and a polyethylene polymer or polymer blend having a Melt Relaxation Index of 2 or more (i.e., films made from Samples 4B, 5B, 7B, 8B, 9B, 10B, and 11B) exhibited significant improvements in nWVTR as compared to their non-nucleated counterparts (i.e., films made from Samples 4A, 5A, 7A, 8A, 9A, 10A, and 11A, respectively). By way of contrast, the addition of the same bicyclo[2.2.1]heptane-2,3-dicarboxylate salt did not have an appreciable impact on those polymers having a Melt Relaxation Index less than 2. In particular, the blown films made from a polymer composition containing a bicyclo[2.2.1]heptane-2,3-dicarboxylate salt and a polyethylene polymer or polymer blend having a Melt Relaxation Index of less than 2 (i.e., films made from Samples 1B, 2B, 3B, and 6B) exhibited essentially the same nWVTR as compared to their non-nucleated counterparts (i.e., films made from Samples 1A, 2A, 3A, and 6A, respectively). Decreases in WVTR are directly related to nucleation of the polyethylene polymer composition by the bicyclo[2.2.1]heptane-2,3-dicarboxylate salt. Thus, the differences between these two groups' results show that the bicyclo[2.2.1]heptane-2,3-dicarboxylate salt is more effective at nucleating those polymers and polymer blends with a Melt Relaxation Index of 2 or more. This is surprising because nothing known in the art suggests that nucleation with a bicyclo[2.2.1]heptane-2,3-dicarboxylate salt is dependent upon these polymer characteristics. However, as explained above, the inventors believe this difference is due to the lower degree of melt relaxation exhibited by polymers having a Melt Relaxation Index less than 2. In such polymers, the polymer melt relaxes slowly, resulting in appreciable amounts of strain-induced, self-nucleation rather than nucleation by the bicyclo[2.2.1]heptane-2,3-dicarboxylate salt.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for producing a film, the method comprising the steps of:
   (a) providing an apparatus comprising:
      (i) a die having an annular die orifice adapted to extrude a tube;
      (ii) a means for blowing pressurized fluid into the tube exiting the annular die orifice; and
      (iii) a means for drawing and collecting the tube;
   (b) providing a thermoplastic polymer composition comprising (i) a polyethylene polymer composition having a melt relaxation index of 2 or greater; and (ii) a salt of bicyclo[2.2.1]heptane-2,3-dicarboxylic acid;
   (c) heating the thermoplastic polymer composition to a temperature sufficient to melt the thermoplastic polymer composition so that it may be extruded through the die;
   (d) extruding a molten thermoplastic polymer composition through the annular die orifice to form a tube exiting the annular die orifice in a first direction, the tube having a diameter and a length;
   (e) blowing a pressurized fluid into the tube under sufficient pressure to inflate the tube and increase its diameter while simultaneously drawing the tube in the first direction to increase its length, thereby producing a film;
   (f) allowing the film to cool to a temperature at which the thermoplastic polymer composition solidifies; and
   (g) collecting the film.

2. The method of claim 1, wherein the polyethylene polymer composition has a melt relaxation index of 2.1 or greater.

3. The method of claim 1, wherein the polyethylene polymer composition has a melt flow index at 190° C. of 2 dg/min or less.

4. The method of claim 1, wherein the thermoplastic polymer composition comprises a salt of cis-endo-bicyclo [2.2.1]heptane-2,3-dicarboxylic acid.

5. The method of claim 1, wherein the salt of bicyclo [2.2.1]heptane-2,3-dicarboxylic acid is calcium bicyclo [2.2.1]heptane-2,3-dicarboxylate.

6. The method of claim 1, wherein the thermoplastic polymer composition contains about 100 ppm to about 3,000 ppm of the salt of bicyclo[2.2.1]heptane-2,3-dicarboxylic acid.

7. The method of claim 1, wherein the thermoplastic polymer composition further comprises an acid scavenger selected from the group consisting of salts of $C_{12}$-$C_{22}$ fatty acids, hydrotalcite compounds, and mixtures thereof.

8. The method of claim 7, wherein the polymer composition contains about 100 ppm to about 3,000 ppm of the acid scavenger.

9. The method of claim 7, wherein the acid scavenger is a salt of a $C_{12}$-$C_{22}$ fatty acid.

10. The method of claim 9, wherein the salt of a bicyclo [2.2.1]heptane-2,3-dicarboxylic acid and the salt of a $C_{12}$-$C_{22}$ fatty acid are present in the thermoplastic polymer composition in a mass ratio of about 3:1 to about 1:3 based on a mass of the salt of a bicyclo[2.2.1]heptane-2,3-dicarboxylic acid to a mass of the salt of a $C_{12}$-$C_{22}$ fatty acid.

11. The method of claim 9, wherein the acid scavenger is a salt of stearic acid.

12. The method of claim 11, wherein the salt of a bicyclo[2.2.1]heptane-2,3-dicarboxylic acid and the salt of stearic acid are present in the thermoplastic polymer composition in a mass ratio of about 3:1 to about 1:3 based on the mass of the salt of a bicyclo[2.2.1]heptane-2,3-dicarbox-ylic acid to the mass of the salt of stearic acid.

13. The method of claim 1, wherein the polyethylene polymer composition has a density of about 940 kg/m$^3$ or more.

14. The method of claim 13, wherein the polyethylene polymer composition has a density of about 940 kg/m$^3$ to about 970 kg/m$^3$.

15. The method of claim 14, wherein the polyethylene polymer composition has a density of about 945 kg/m$^3$ to about 967 kg/m$^3$.

16. The method of claim 15, wherein the polyethylene polymer composition has a density of about 955 kg/m$^3$ to about 965 kg/m$^3$.

* * * * *